Figure 1:
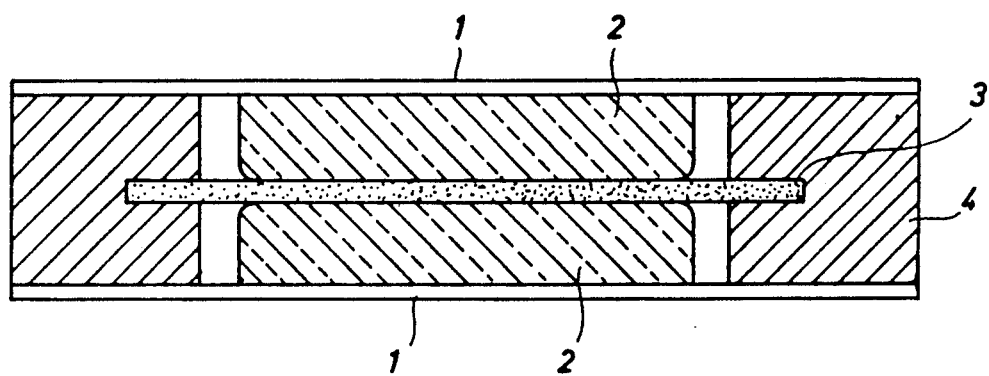

United States Patent [19]

Tsuzuki et al.

[11] Patent Number: 5,082,594
[45] Date of Patent: Jan. 21, 1992

[54] MATERIAL FOR POLARIZABLE ELECTRODE

[75] Inventors: Yasushi Tsuzuki, Shiga; Toshio Tanaka; Yasuhiro Iizuka, both of Ootsu, all of Japan

[73] Assignee: Toyo Boseki Kabushiki Kaisha, Osaka, Japan

[21] Appl. No.: 653,157

[22] Filed: Feb. 11, 1991

Related U.S. Application Data

[63] Continuation of Ser. No. 245,293, Sep. 16, 1988, abandoned.

[30] Foreign Application Priority Data

Sep. 25, 1987 [JP] Japan .................................. 62-240213

[51] Int. Cl.$^5$ ............................................. H01B 1/04
[52] U.S. Cl. .................................... 252/502; 252/511; 429/212; 429/213; 429/210
[58] Field of Search ............... 252/502, 511; 429/213, 429/218, 194, 210, 232, 253, 255; 423/460; 361/330, 303, 305; 428/408

[56] References Cited

U.S. PATENT DOCUMENTS

| | | | |
|---|---|---|---|
| 4,248,945 | 2/1981 | Alvareg et al. | 429/194 |
| 4,351,815 | 9/1982 | Glasstetter et al. | 423/460 |
| 4,565,744 | 1/1986 | Muramatsu et al. | 429/213 |
| 4,610,811 | 9/1986 | Yamamoto et al. | 252/502 |
| 4,621,036 | 2/1981 | Dobbapaneni | 429/213 |
| 4,628,015 | 12/1986 | Yata et al. | 429/213 |
| 4,758,473 | 7/1988 | Herscovici et al. | 252/511 |
| 4,810,600 | 3/1989 | Periaid et al. | 252/511 |

Primary Examiner—Josephine Barr
Attorney, Agent, or Firm—Wenderoth, Lind & Ponack

[57] ABSTRACT

A material is provided for a polarizable electrode. The material comprises a porous carbon material of activated carbon, activated carbon fibers, carbon fibers or powdery carbon as a raw material, wherein the total amount of acid groups of said porous carbon materials is 0.45 to 4.0 $\mu$eq/m$^2$ based on the BET surface area of said carbon material. The material is produced by subjecting the porous carbon raw material to dry oxidation treatment in an oxygen atmosphere whereby the total amount of acid groups introduced into said porous carbon material is 0.45 to 4.0 $\mu$eq/m$^2$ based on the BET surface area of said material.

1 Claim, 1 Drawing Sheet

MATERIAL FOR POLARIZABLE ELECTRODE

This application is a continuation of now abandoned application, Ser. No. 07/245,293 filed on Sept. 16, 1988 abandoned.

The present invention relates to a carbon material for polarizable electrodes used in electric double layer capacitors and rechargeable batteries, and as the counter electrode of electrochromic display, etc.

The electric double layer capacitors are composed of a pair of polarizable electrodes facing each other through an insulating separator, said polarizable electrodes and separator having been impregnated with an electrolyte. As a material for such polarizable electrodes, powdery activated carbon and activated carbon fibers are generally used. As the electrolyte, electrolytes of an aqueous sulfuric acid solution system and non-aqueous electrolytes such as a propylene carbonate solution of tetraethylammonium perchlorate, etc. are used.

As the rechargeable batteries with polarizable electrodes, there have been developed those of a structure that one of the polarizable electrodes of the electric double layer capacitors is replaced by lithium, powdery activated carbon is used as the other polarizable electrode, and that an organic electrolyte is used as the electrolyte.

For the electro-chromic display, there have been devised those of a structure that tungsten oxide, iron pentacyanocarbonylferrate, etc. are used in the display electrode, and that graphite powders, activated carbon fibers, etc. are used in the counter electrode.

Any of the polarizable electrodes used in these electric double layer capacitors, rechargeable batteries and electro-chromic display makes use of electric double layer formed at the interface between the electrode surface and the electrolyte.

By using therefore activated carbon or activated carbon fibers having a large specific surface area as a material for the polarizable electrodes, there are obtained characteristics that the electrodes can be elevated in energy density and can be made small in size.

The specific surface area of these activated carbon and activated carbon fibers is generally from 1,000 to 2,500 m$^2$/g.

The capacity of the electric double layer changes with the kind and concentration of ions and the solvent in the electrolyte, but the found value of the differential capacitance of Hg in a 1.0N aqueous NaF solution is about 24 $\mu$F/cm$^2$ (by Graham). On applying this value as it is to the case of polarizable electrodes comprising activated carbon or activated carbon fibers and having the foregoing specific surface area, the capacity of electric double layer calculated from the specific surface area is from 240 to 480 F/g, having extremely a large value. In reality, however, a capacity of electric double layer of from about a half to about one fourth the foregoing value is only obtained. In other words, this means that only a part of the whole surface area of these activated carbon and activated carbon fibers is made effective use of.

As described above, when the conventional activated carbon or activated carbon fibers are used as a material for the polarizable electrodes, there occurs a problem that the coefficient of utilization of the whole surface area of these materials is very bad. Consequently, such a large capacity of electric double layer as expected from the specific surface area cannot be obtained.

In view of such situation, the present inventors have extensively studied on a carbon material for polarizable electrode which is large in the capacity of electric double layer per unit surface area, and as a result, have completed the present invention.

The present invention provides a material for polarizable electrode comprising a porous carbon material obtained with activated carbon, activated carbon fibers, carbon fibers or powdery carbon as a raw material, wherein the total amount of acid groups of said porous carbon material is 0.45 $\mu$eq/m$^2$ or more based on the whole surface area.

As the material for polarizable electrode of the present invention, there may be used activated carbon, activated carbon fibers, carbon fibers and powdery carbon.

Activated carbon referred to herein is one produced by carbonizing natural plants (e.g. sawdust, coconut husk), aromatic polycyclic condensates obtained from coal, etc. or synthetic resins (e.g. phenolic resins) and activating the resulting carbides by the usual method.

The activated carbon fibers referred to herein are ones produced by carbonizing pitch obtained from coal or petroleum, or fibers of phenolic series, acrylic series, aromatic polyamide series, cellulosic series, etc. and activating the resulting carbides by the usual method.

There is particularly no limitation to the specific surface area of these activated carbon and activated carbon fibers, but a specific surface area of 2,000 m$^2$/g or less is preferred for the reasons described later.

The carbon fibers referred to herein are ones produced by carbonizing pitch obtained from coal or petroleum, or fibers of phenolic series, acrylic series, aromatic polyamide series, cellulosic series, etc.

Those which constitute the tissue of these carbon fibers and activated carbon fibers are spun yarn, filament tow, non-woven fabric, woven fabric, knit fabric, carbon fiber aggregates obtained by combination thereof, powdery carbon materials obtained by pulverization thereof, etc.

The powdery carbon referred to herein is one produced by carbonizing natural plants (e.g. sawdust, coconut husk), aromatic polycyclic condensates (e.g. coal) or powders of synthetic resins (e.g. phenolic resin).

Reference has been made above to the material for polarizable electrode of the present invention, but all the carbonized materials and their activated products can be used as the material, there being particularly no limitation to the shape and tissue thereof.

The total amount of acid groups referred to in the present invention means the amounts of hydroxyl groups (—OH) and/or carboxyl groups (—COOH) present at the surface of the foregoing carbon materials.

By using the porous carbon materials, of which the total amount of acid groups is 0.45 $\mu$eq/m$^2$ or more, preferably from 0.5 to 4.0 $\mu$eq/m$^2$ based on the whole surface area, as a material for polarizable electrode, the coefficient of utilization of the surface area can be elevated, whereby a large capacity of electric double layer per unit surface area is obtained.

On the other hand, when porous carbon materials are used in which the total amount of acid groups based on the whole surface area is less than 0.45 $\mu$eq/m$^2$, i.e. the amount of acid groups present at the surface is small, the coefficient of utilization of the surface area is so low that such a large capacity of electric double layer as expected from the specific surface area is not obtained.

As described above, by using porous carbon materials increased in the amount of acid groups present at the surface as a material for polarizable electrode, it is possible to elevate the coefficient of utilization of the surface area and obtain a large capacity of electric double layer.

Such porous carbon materials having a large amount of acid groups at the surface are obtained by dry oxidation treatment of the foregoing various carbon materials. For example, said treatment is carried out so that a yield by weight is 40% or more under an oxygen atmosphere having an oxygen partial pressure of $1 \times 10^{-2}$ torr or more. When the yield by weight is reduced to less than 40%, etching of the surface proceeds to cause an increase in contact resistance, so that such the yield by weight is not preferred. Preferably, the treatment temperature is usually 300° C. or higher. At a treatment temperature lower than 300° C., the reactivity of the carbon materials to be treated lowers, so that the effect of oxidation is not obtained. When the oxidation treatment is carried out by a wet form, there occur many problems that intercalation compounds are formed and poisonous gases are evolved at the time of the treatment, so that such the treatment should be avoided. This dry oxidation treatment may be carried out by the one-stage form, or two or more-stage form at different temperatures. Further, this treatment may be carried out by generating plasma in place of heating, or by combining plasma and heating.

Next, methods for measuring the total amount of acid groups, specific surface area and capacity of electric double layer used in the present invention will be explained by referring partly to FIG. 1.

FIG. 1 is a drawing illustrating a cell for measuring the capacity of electric double layer of the material for polarizable electrode of the present invention.

(1) Total amount of acid groups

After a material for electrode was washed with water and dried, about 1 g of the material was vacuum-dried at a temperature of 120° C. for 12 hours, weighed, dipped in 60 ml of a N/10 aqueous NaOH solution and shaken at a temperature of 25° C. for 10 hours. This solution was filtered through a glass filter, and 25 ml of the filtrate was accurately weighed and back-titrated with a N/10 HCl standard solution. Phenolphthalein was used as an indicator at the time of titration. A blank test was also carried out similarly and the total amount of acid groups per weight of the material was obtained from the following equation:

$$\text{Total amount of acid groups} = -\frac{2.4 D \cdot K}{W} \times 10^3 \, (\mu eq/g)$$

wherein D (ml) is a value obtained by subtracting the titer of the N/10 HCl standard solution at the blank test from that at the actual test, K is the normality of the N/10 HCl standard solution and W (g) is the weight of the material for electrode.

(2) Specific surface area

About 0.1 g of a material for electrode was sampled, vacuum-dried at a temperature of 120° C. for 12 hours and weighed. The amount of a nitrogen gas, which was at the boiling point ($-195.8°$ C. of liquid nitrogen, adsorbed to the material was measured at several points while the relative pressure was gradually increased in a range of from 0.0 to 0.2, and the surface area (m²/g) per weight was obtained by the B.E.T. plotting method.

Using the found values obtained in (1) and (2), the total amount of acid groups per surface area ($\mu eq/m^2$) was calculated.

(3) Capacity of electric double layer

Measurement was carried out using as electrolytes a 4N aqueous $H_2SO_4$ solution and a propylene carbonate/ethylene glycol dimethyl ether mixed solution containing 1M of lithium perchlorate dissolved therein, and a cell shown in FIG. 1. In FIG. 1, 1 is a current-collecting carbon plastic film, 2 is a material for polarizable electrode, 3 is a separator comprising a microporous polyolefin film and 4 is an insulating spacer comprising a polyethylene resin. Using the aqueous solution system and organic electrolyte system, constant-current charge/discharge was carried out at current densities of 15 mA/g and 7.5 mA/g, respectively, per weight of the material for electrode used in the cell. The direct-current electrostatic capacitance of the cell was then obtained from the discharge curves using the following equation, and the value obtained was taken as the capacity of electric double layer.

$$\text{Capacity of electric double layer} = \frac{Q}{\Delta V} \quad (F)$$

wherein $\Delta V$ is 0.25 V (0.75 V $-$ 0.50 V) for the aqueous solution system and 0.5 V (1.5 V $-$ 1.0 V) for the organic electrolyte system, and Q is the quantity of electricity (C) drawn by a voltage drop of $\Delta V$. The charge/discharge was carried out between 0 V and 0.9 V for the aqueous solution system and between 0 V and 1.8 V for the organic electrolyte system. Assuming, for convenience' sake, that the cell used for measurement was equivalent to a circuit comprising two condensers of the same capacity connected in series with each other, the capacity per weight (F/g) of the material for electrode was calculated, and the capacity of electric double layer per unit surface area of the material for electrode was obtained from the found value obtained in (2).

$$\begin{bmatrix} \text{Capacity of electric} \\ \text{double layer per unit} \\ \text{surface area of the} \\ \text{material for electrode} \end{bmatrix} = \frac{2 \times \begin{bmatrix} \text{capacity (F) of electric double} \\ \text{layer of the measured cell} \end{bmatrix}}{\begin{bmatrix} \text{weight (g) of the} \\ \text{material of the} \\ \text{single electrode} \end{bmatrix} \times \begin{bmatrix} \text{specific} \\ \text{surface area} \\ (m^2/g) \end{bmatrix}} \times \frac{10^6}{10^4} \, (\mu F/cm^2)$$

For forming the electric double layer at the surface of the electrode, it is first necessary for a solvent in the electrolyte to be in contact with the surface of the material for electrode. In other words, the wettability of the surface of the material by the solvent in the electrolyte should be good.

However, carbon is hydrophobic in itself, being difficult to get wet by polar solvents such as aqueous solutions. On the other hand, at the surface of activated carbon and activated carbon fibers are formed various functional groups such as

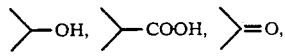

etc. by activation treatment, and as a result, hydrophilicity is given to activated carbon and activated carbon fibers by the acid groups such as mainly —OH and —COOH groups. However, the amount of acid groups at the surface of conventional activated carbon and activated carbon fibers is so small that it is impossible to wet the whole surface of said carbon and carbon fibers with the electrolyte, and many fine pores which are not full of the electrolyte are considered to be present. Consequently, the coefficient of utilization of the surface area lowers, which has made it impossible to obtain such a large capacity of electric double layer as expected from the value of the specific surface area.

Contrary to this, the material for polarizable electrode of the present invention has an increased amount of acid groups at its surface as compared with the conventional activated carbon and activated carbon fibers. As a result, the wettability of its surface by the electrolyte improves, so that the coefficient of utilization of the surface area, i.e. the capacity of electric double layer per unit surface area can remarkably be increased. In this case, aqueous solution systems are thought to be optimum as the electrolyte, but the same effect can also be obtained with organic systems, for example, highly polar solvent systems such as propylene carbonate, $\gamma$-butyrolactone, etc.

There is particularly no limitation to the specific surface area of the carbon material (before the dry oxidation) which is the material for polarizable electrode of the present invention. It is however possible for even carbon fibers and carbon materials suffering no activation treatment to obtain a specific surface area of about 1,000 $m^2/g$ by the dry oxidation treatment. Also, when carbon materials having a too large specific surface area are used as the raw materials contact resistance increases and the distribution of functional groups at the surface becomes non-uniform with the advance of etching at the surface, so that a specific surface area of 2,000 $m^2/g$ or less is preferred.

Next, the present invention will be illustrated with reference to the following examples. Hereupon, the total amount of acid groups and the capacity of electric double layer of the material for electrode were measured by the methods described above.

EXAMPLE 1

A carbon fiber fabric carbonized at a temperature of 850° C. was subjected to oxidation treatment in air at a temperature of 500° C. to obtain fabric A. The total amount of acid groups per surface area of fabric A was 2.0 $\mu eq/m^2$, and the capacity of electric double layer per surface area thereof was 26.7 $\mu F/cm^2$ when the electrolyte was a 4N aqueous $H_2SO_4$ solution, and 9.9 $\mu F/cm^2$ when a solution of 1M of lithium perchlorate in a propylene carbonate/ethylene glycol dimethyl ether (70/30) mixture was used as an organic electrolyte.

EXAMPLE 2

An activated carbon fiber fabric having a specific surface area of 610 $m^2/g$ was subjected to oxidation treatment in air at a temperature of 500° C. to obtain fabric B. The total amount of acid groups of fabric B was 2.3 $\mu eq/m^2$, and the capacity of electric double layer thereof was 28.2 $\mu F/cm^2$ for the same aqueous electrolyte system as used in Example 1, and 14.2 $\mu F/cm^2$ for the same organic electrolyte system as used in Example 1.

EXAMPLE 3

An activated carbon fiber fabric having a specific surface area of 1,000 $m^2/g$ was subjected to oxidation treatment in air at a temperature of 500° C. to obtain fabric C. The total amount of acid groups of fabric C was 2.4 $\mu eq/m^2$, and the capacity of electric double layer thereof was 23.8 $\mu F/cm^2$ for the same aqueous electrolyte system as used in Example 1, and 11.5 $\mu F/cm^2$ for the same organic electrolyte system as used in Example 1.

EXAMPLE 4

An activated carbon fiber fabric having a specific surface area of 1,570 $m^2/g$ was subjected to oxidation treatment in air at a temperature of 500° C. to obtain fabric D. The total amount of acid groups of fabric D was 1.0 $\mu eq/m^2$, and the capacity of electric double layer thereof was 15.6 $\mu F/cm^2$ for the same aqueous electrolyte system as used in Example 1, and 7.2 $\mu F/cm^2$ for the same organic electrolyte system as used in Example 1.

COMPARATIVE EXAMPLE 1

The activated carbon fiber fabric of 610 $m^2/g$ in specific surface area used in Example 2 was taken as fabric E, and this fabric was evaluated without being oxidation-treated. The total amount of acid groups of fabric E was 0.02 $\mu eq/m^2$, and the capacity of electric double layer thereof was 5.0 $\mu F/cm^2$ for the same aqueous electrolyte system as used in Example 1, and 2.5 $\mu F/cm^2$ for the same organic electrolyte system as used in Example 1.

COMPARATIVE EXAMPLE 2

The activated carbon fiber fabric of 1,000 $m^2/g$ in specific surface area used in Example 3 was taken as fabric F, and this fabric was evaluated without being oxidation-treated. The total amount of acid groups of fabric F was 0.24 $\mu eq/m^2$, and the capacity of electric double layer thereof was 12.0 $\mu F/cm^2$ for the same aqueous electrolyte system as used in Example 1, and 6.5 $\mu F/cm^2$ for the same organic electrolyte system as used in Example 1.

COMPARATIVE EXAMPLE 3

The activated carbon fiber fabric of 1,570 $m^2/g$ in specific surface area used in Example 4 was taken as fabric G, and this fabric was evaluated without being oxidation-treated. The total amount of acid groups of fabric G was 0.17 $\mu eq/m^2$, and the capacity of electric double layer thereof was 11.1 $\mu F/cm^2$ for the same aqueous electrolyte system as used in Example 1, and 6.1 $\mu F/cm^2$ for the same organic electrolyte system as used in Example 1.

The results described above are collected in Table 1.

TABLE 1

| Number of a material for electrode | | Total amount of acid groups ($\mu$eq/m$^2$) | Capacity of electric double layer ($\mu$F/cm$^2$) | |
| --- | --- | --- | --- | --- |
| | | | Aqueous electrolyte system | Organic electrolyte system |
| Present invention | A | 2.0 | 26.7 | 9.9 |
| | B | 2.3 | 28.2 | 14.2 |
| | C | 2.4 | 23.8 | 11.5 |
| | D | 1.0 | 15.6 | 7.2 |
| Comparative example | E | 0.02 | 5.0 | 2.5 |
| | F | 0.24 | 12.0 | 6.5 |
| | G | 0.17 | 11.1 | 6.1 |

As described above, by using the material for polarizable electrode of the present invention, it is possible to elevate the coefficient of utilization of the surface area and remarkably elevate the capacity of electric double layer per surface area. Consequently, by using the material for polarizable electrode of the present invention to produce electric double layer capacitors and rechargeable batteries, it is possible to elevate the energy density. Also, by using said material to produce the counter electrode of electro-chromic display, the counter electrode can be made smaller in volume and thinner in thickness than the conventional ones, and thus industrially large practicability can be brought about.

What is claimed is:

1. A polarizable electrode comprising a porous carbon material of activated carbon, activated carbon fibers, carbon fibers or powdery carbon as a raw material, wherein the total amount of acid groups of said porous carbon material is 0.45 to 4.0 $\mu$eq/m$^2$ based on the BET surface area of said carbon material, the acid groups being at least one of a hydroxyl group and a carboxyl group.

* * * * *